US008989375B2

(12) United States Patent
Kanda

(10) Patent No.: US 8,989,375 B2
(45) Date of Patent: Mar. 24, 2015

(54) VIDEO RECEIVING APPARATUS AND VIDEO RECEIVING METHOD

(75) Inventor: Tomohiro Kanda, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/429,868

(22) Filed: Mar. 26, 2012

(65) Prior Publication Data

US 2013/0083922 A1    Apr. 4, 2013

(30) Foreign Application Priority Data

Sep. 30, 2011   (JP) ................................. 2011-218692

(51) Int. Cl.
| | |
|---|---|
| G06F 21/00 | (2013.01) |
| H04L 29/06 | (2006.01) |
| G06F 13/00 | (2006.01) |
| H04N 7/173 | (2011.01) |
| H04L 9/08 | (2006.01) |
| H04N 7/167 | (2011.01) |

(52) U.S. Cl.
CPC ................ *G06F 13/00* (2013.01); *H04N 7/173* (2013.01)
USPC ............... 380/200; 348/563; 345/156; 726/5; 725/37; 725/74; 725/136; 713/300; 705/30

(58) Field of Classification Search
USPC ............... 380/200; 348/563; 725/37, 136, 74; 345/156; 726/5; 713/300; 705/30
See application file for complete search history.

(56) References Cited

U.S. PATENT DOCUMENTS 8,321,917 B2 * 11/2012 Kikkawa et al. ................... 726/5
2007/0234084 A1 * 10/2007 Furuta ........................... 713/300

(Continued)

FOREIGN PATENT DOCUMENTS

JP   2003-061163        2/2003
JP   2004336178  A  *  11/2004

(Continued)

OTHER PUBLICATIONS

Thomas Winkler, Bernhard Rinner; Security and Privacy Protection in Visual Sensor Networks: A Survey; May 2014; Computing Surveys (CSUR), vol. 47 Issue; Publisher: ACM; pp. 1-42.*

(Continued)

*Primary Examiner* — Kambiz Zand
*Assistant Examiner* — Courtney Fields
(74) *Attorney, Agent, or Firm* — Blakely, Sokoloff, Taylor & Zafman LLP

(57) ABSTRACT

According to one embodiment, a video receiving apparatus includes: a receiving module for receiving identifiers of respective video transmitting apparatus and key information to be used for permitting a wireless communication with the video receiving apparatus; a connecting module for establishing a wireless connection with each video transmitting apparatus; a registering module for registering all or part of the one or more video transmitting apparatus; a first display control module for displaying identification information of the one or more video transmitting apparatus, selection images, registration information indicating whether or not the one or more video transmitting apparatus are registered, and connection information indicating whether or not wireless connections are established on a display screen; a video receiving module for receiving video from the specified video transmitting apparatus using the established wireless connection; and a second display control module for displaying the received video on the display screen.

28 Claims, 7 Drawing Sheets

(56) References Cited

U.S. PATENT DOCUMENTS

| | | | |
|---|---|---|---|
| 2009/0167946 A1 | 7/2009 | Samada et al. | |
| 2010/0165197 A1 | 7/2010 | Hattori | |
| 2011/0166968 A1* | 7/2011 | Houng et al. | 705/30 |

FOREIGN PATENT DOCUMENTS

| | | |
|---|---|---|
| JP | 2005-266777 | 9/2005 |
| JP | 2007-189576 | 7/2007 |
| JP | 2009111864 | 5/2009 |
| JP | 2009158223 | 7/2009 |
| JP | 2009-267954 | 11/2009 |

OTHER PUBLICATIONS

To validate the capability of the new technology "Intel WiDi" which connects a PC and a TV in a wireless manner, Feb. 24, 2011, URL http://trendy.nikkeibp.co.jp/article/pickup/20110222/1034589/?p=2, (with English Translation).

Japanese Patent Application No. 2011-218692, Notice of Reasons for Refusal, mailed Jul. 17, 2012, (with English Translation).

\* cited by examiner

- - - - - - - CONNECTION SETTING COMPLETED

⟶ TRANSMISSION OF VIDEO

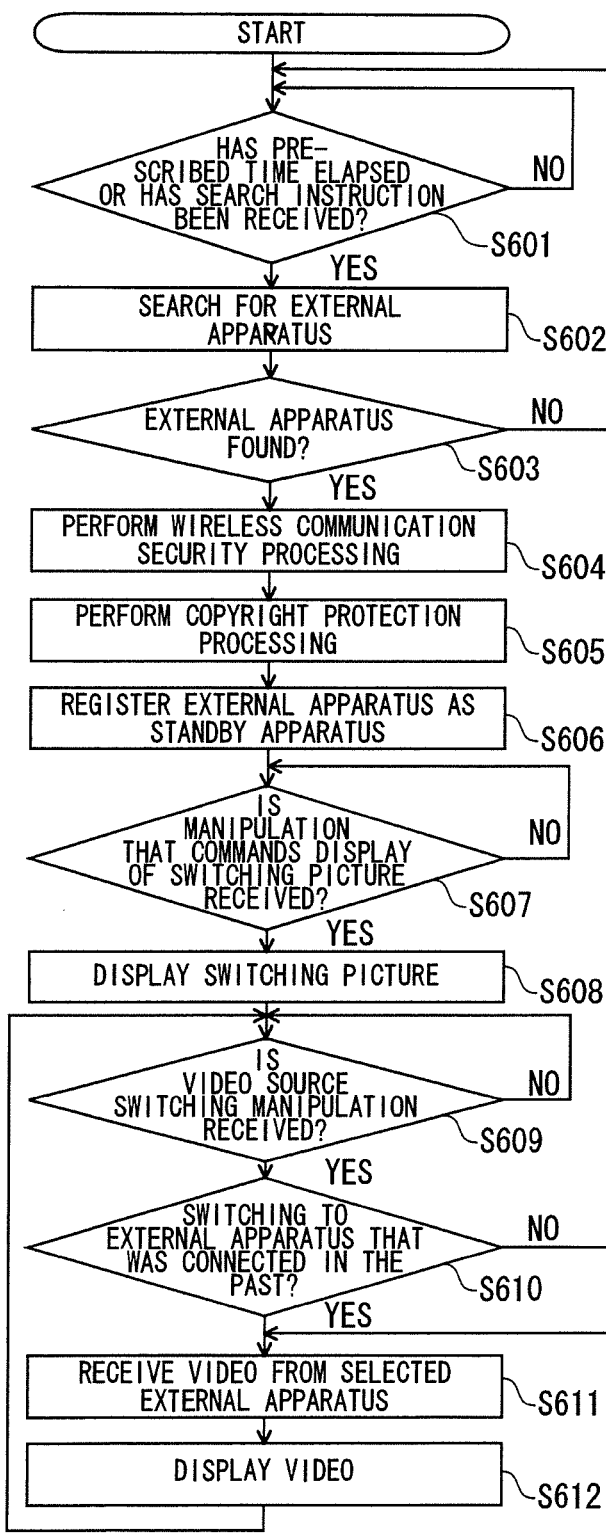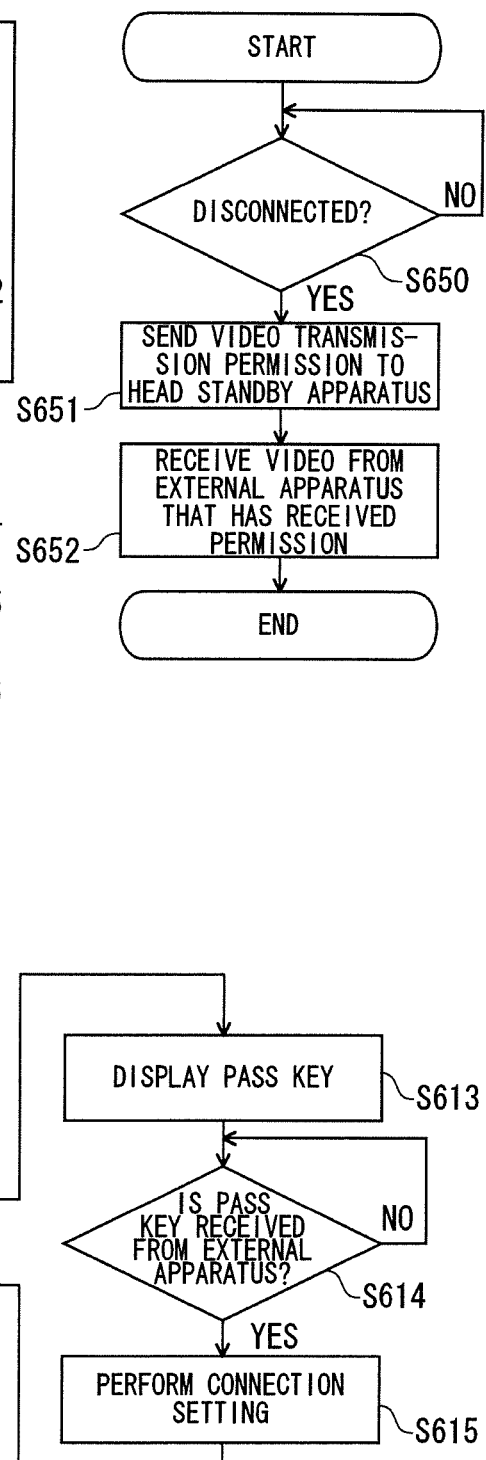
FIG. 6A
FIG. 6B

VIDEO RECEIVING APPARATUS AND VIDEO RECEIVING METHOD

CROSS REFERENCE TO RELATED APPLICATION(S)

The application is based upon and claims the benefit of priority from Japanese Patent Application No. 2011-218692 filed on Sep. 30, 2011, the entire contents of which are incorporated herein by reference.

BACKGROUND

1. Field

The present invention relates to a video receiving apparatus and a video receiving method.

2. Description of the Related Art

A technique is known in which such an apparatus as a PC sends video wirelessly and a display apparatus receives and displays the video. In this technique, the video output apparatus sends video by a one-to-one communication after making wireless connection security setting with the display apparatus. When a copyright-protected content is to be transmitted, the content is transmitted after information for generation of an encryption key is exchanged between the video transmission side and the video reception side. To switch the video transmission source apparatus from a current apparatus to another one, the display apparatus again performs security setting, encryption key generation processing, etc. with the other apparatus.

When the display apparatus switches from display of video of a certain source to display of video transmitted from a video transmitting apparatus such as a PC, it is preferable that processing relating to the switching be performed properly.

BRIEF DESCRIPTION OF THE DRAWINGS

A general configuration that implements the various features of embodiments will be described with reference to the drawings. The drawings and the associated descriptions are provided to illustrate embodiments and not to limit the scope of the embodiments.

FIGS. 6A and 6B are flowcharts of example processes relating to video reception which are executed by the display apparatus according to the embodiment.

DETAILED DESCRIPTION

According to one embodiment, a video receiving apparatus, configured to receive video from one of one or more video transmitting apparatus by a selecting manipulation, the video receiving apparatus includes: a receiving module configured to receive identifiers of the respective video transmitting apparatus and key information to be used for permitting a wireless communication with the video receiving apparatus from the one or more video transmitting apparatus before the selecting manipulation is made; a connecting module configured to establish a wireless connection with each video transmitting apparatus from which key information is received; a registering module configured to register all or part of the one or more video transmitting apparatus with which the video receiving apparatus established a wireless communication in the past; a first display control module configured to display identification information of the one or more video transmitting apparatus, selection images that enable selection of the one or more video transmitting apparatus, registration information indicating whether or not the one or more video transmitting apparatus are registered in the registering module, and connection information indicating whether or not wireless connections are established between the video receiving apparatus and the one or more video transmitting apparatus on a display screen; a video receiving module configured to receive video from the specified video transmitting apparatus using the established wireless connection when the selecting manipulation that specifies one video transmitting apparatus by the selection image; and a second display control module configured to display the received video on the display screen.

An embodiment will be hereinafter described with reference to the drawings.

Figure 1:
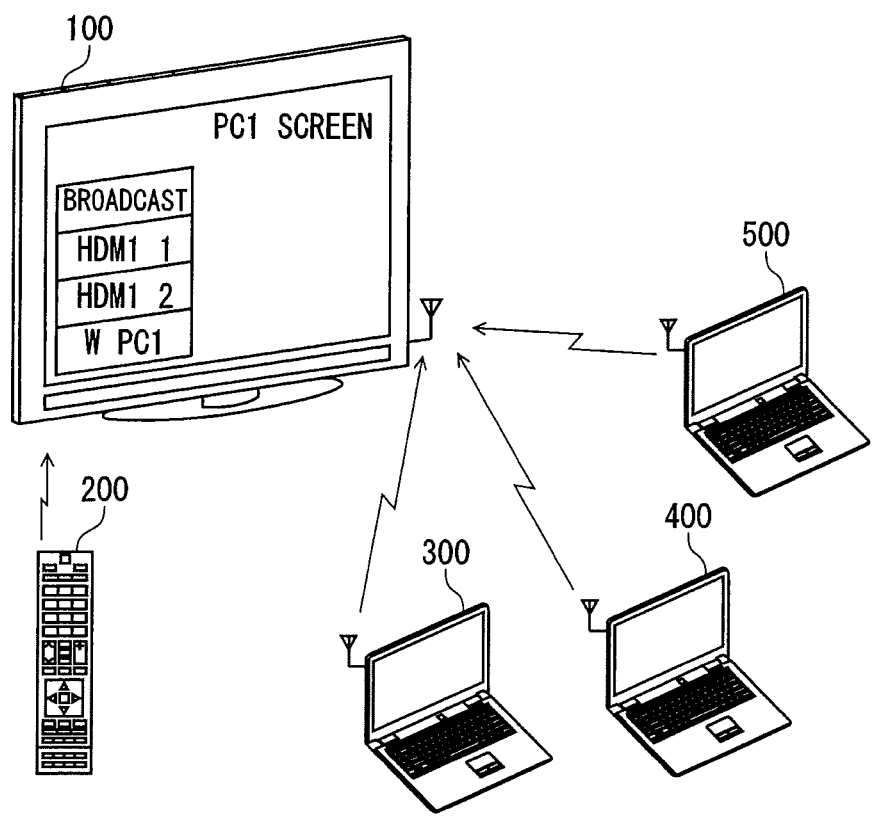
FIG. 1 shows an example use form of a display apparatus (video receiving apparatus) according to an embodiment.

FIG. 1 shows an example use form of a video receiving apparatus (display apparatus 100) according to the embodiment. The display apparatus 100 switches the input of video to be displayed by itself according to a control signal supplied from a remote controller 200. For example, the display apparatus 100 selects (makes switching to) video to be displayed by itself from video of a broadcast program carried by broadcast waves, video that is input via a wired interface of HDMI or the like, and video that is transmitted by a wireless communication of, for example, wireless LAN of the IEEE 802.11 standard (Wi-Fi) according to a control signal supplied from the remote controller 200. The display apparatus 100 displays the video of the selected source.

Each of computers 300 to 500 can connect to and send video to a display apparatus by a wireless communication of wireless LAN or the like. To send video to the display apparatus 100, each of the computers 300 to 500 makes security setting for wireless communication. For example, the security setting is authentication of an apparatus using a pass key such as a PIN code. If one of the computers 300 to 500 acquires a pass key that is set in the display apparatus 100 and sends it to the display apparatus 100, the display apparatus 100 permits a wireless communication between itself and the one computer 300, 400, or 500.

To send a copyright-protected content to the display apparatus 100, each of the computers 300 to 500 performs processing that complies with the HDCP (high-bandwidth digital content protection system), for example, with the display apparatus 100. More specifically, before transmission of video of a protected content, authentication and key exchange are performed according to the HDCP standard and a video ES encryption key is thereby determined. The video is sent after encrypting it with the determined key.

Figure 2:
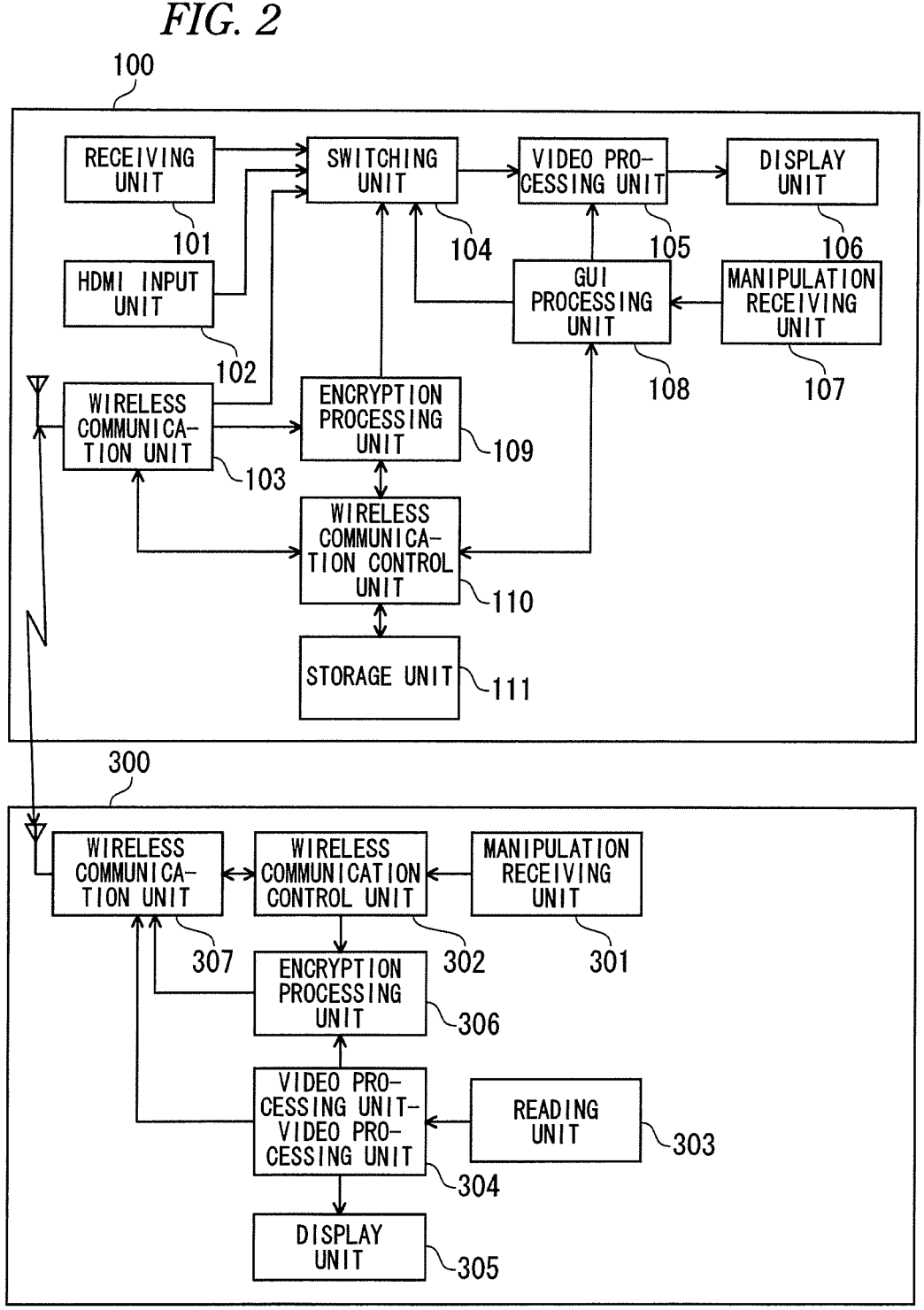
FIG. 2 is a block diagram showing an example system configuration of the display apparatus according to the embodiment and a computer (video transmitting apparatus)

FIG. 2 is a block diagram showing example functional configurations of the display apparatus 100 and the computer 300. The functional configuration of each of the computers 400 and 500 is the same as that of the computer 300 and hence will not be described.

The display apparatus 100 is equipped with a receiving unit 101, an HDMI input unit 102, a wireless communication unit 103, a switching unit 104, a video processing unit 105, a display unit 106, a manipulation receiving unit 107, a GUI processing unit 108, an encryption processing unit 109, a wireless communication control unit 110, a storage unit 111, etc. The receiving unit 101 receives a broadcast signal which carries video data of a broadcast program and outputs the received data to the switching unit 104. An HDMI cable is connected to the HDMI input unit 102, and the HDMI input unit 102 receives video data that is transmitted from an external apparatus via the HDMI cable. The HDMI input unit 102 outputs the received data to the switching unit 104. The wireless communication unit 103 communicates with the computers 300 to 500 and other apparatus. The wireless communication unit 103 receives video data that is transmitted from one of those apparatus and outputs the received data to the switching unit 104. If received data is encrypted by a copyright protection method that complies with HDCP, for example, the wireless communication unit 103 supplies the video data to the switching unit 104 via the encryption processing unit 109.

The switching unit 104 selects one module from the receiving unit 101, the HDMI input unit 102, and the wireless communication unit 103, and outputs, to the video processing unit 105, the video data that is output from the selected module. As described above, video data may be supplied from the wireless communication unit 103 to the switching unit 104 via the encryption processing unit 109.

The video processing unit 105 decodes video data that is input from the switching unit 104 and converts decoded video data into a video signal that is in such a form as to be displayable by the display unit 106. When receiving video data from the GUI processing unit 108, the video processing unit 105 converts the video data into a video signal, superimposes it on a video signal of video data that is input from the switching unit 104, and outputs a resulting video signal to the display unit 106. The display unit 106 displays video using the received video signal.

The manipulation receiving unit 107 receives a manipulation that is input through the remote controller 200 or a manipulation panel (not shown) of the display apparatus 100. For example, the manipulation receiving unit 107 receives a manipulation that is directed to a switching picture (described later). The GUI processing unit 108 generates video data of a picture to be displayed on the display unit 106. For example, the GUI processing unit 108 generates video data of the switching picture (described later) to be displayed on the display unit 106. When a manipulation that is directed to the switching picture being displayed on the display unit 106 is input through the manipulation receiving unit 107, the GUI processing unit 108 controls the switching unit 104 according to the manipulation. More specifically, if a manipulation that commands display of video of a broadcast program is input through the manipulation receiving unit 107, the GUI processing unit 108 instructs the switching unit 104 to output, to the video processing unit 105, video data that is received by the receiving unit 101 and input to the switching unit 104. Likewise, if a manipulation that commands display of video of video data that is received by the HDMI input unit 102 or the wireless communication unit 103 is input through the manipulation receiving unit 107, the GUI processing unit 108 instructs the switching unit 104 to output, to the video processing unit 105, the video data supplied from the module that is specified by the manipulation.

If the wireless communication unit 103 receives encrypted video data, the encryption processing unit 109 decrypts the encrypted video data using an encryption key determined by the wireless communication control unit 110 and outputs decrypted video data to the switching unit 104.

The wireless communication control unit 110 controls a wireless communication that is performed by the wireless communication unit 103. To establish a wireless communication with an external apparatus such as one of the computers 300 to 500, the wireless communication control unit 110 performs setting that relates to wireless communication security of the wireless communication. In doing so, the wireless communication control unit 110 requests the external apparatus to send a pass key and receives the pass key transmitted from the external apparatus. If the received pass key coincides with a pass key that is set in the display apparatus 100 itself, the wireless communication control unit 110 permits the external apparatus to establish a connection of a wireless communication with the display apparatus 100. At this time, the wireless communication control unit 110 stores an identifier of the connection-establishment-permitted external apparatus in the storage unit 111 and thereby registers the external apparatus as a registered apparatus.

Furthermore, the wireless communication control unit 110 performs, with the external apparatus, authentication and key exchange that comply with a prescribed copyright protection method and thereby determines an encryption key to be used for encrypting a video data stream. The wireless communication control unit 110 outputs the determined encryption key to the encryption processing unit 109.

The display apparatus 100 performs security setting every time it performs a wireless communication with an external apparatus. For example, if security setting for plural external apparatus has been completed at a certain time point, the display apparatus 100 may store, in the storage unit 111, queue information indicating order of completion of security setting for the plural external apparatus. Where the display apparatus 100 can maintain wireless connections with plural external apparatus, the display apparatus 100 may store, in the storage unit 111, queue information indicating order of completion of wireless connections.

Next, the computer 300 will be described. The computer 300 is equipped with a manipulation receiving unit 301, a wireless communication control unit 302, a reading unit 303, a video processing unit 304, a display unit 305, an encryption processing unit 306, a wireless communication unit 307, etc.

The manipulation receiving unit 301 receives a manipulation from the user. For example, the manipulation receiving unit 301 receives a video transmission manipulation that commands transmission of video being displayed by the computer 300 to the display apparatus 100 and a manipulation of inputting a pass key such as a PIN code.

The wireless communication control unit 302 controls a wireless communication that is performed by the computer 300. If the manipulation receiving unit 301 receives a video transmission manipulation, the wireless communication control unit 302 causes the wireless communication unit 307 to send a connection request to the display apparatus 100. The connection request contains an identifier of the computer 300. The wireless communication control unit 302 also sends a signal containing identifier of the computer 300 itself to the display apparatus 100 when a search signal is received from the display apparatus 100. When receiving a pass key request in response to the connection request, the wireless communication control unit 302 sends the display apparatus 100 a pass key that is input through the manipulation receiving unit 301. The wireless communication control unit 302 stores a pass key that is input through the manipulation receiving unit 301 in a memory (not shown) and sends the stored pas key upon reception of a pass key request.

After sending the pass key to the display apparatus 100, the wireless communication control unit 302 receives, from the display apparatus 100, an encryption key to be used for a wireless communication with the display apparatus 100. Then, the wireless communication control unit 302 establishes a connection of a wireless communication with the display apparatus 100 using the received encryption key. The display apparatus 100 may be configured so as to store an encryption key for a wireless communication in a memory (not shown) and to establish a connection of a wireless communication using the stored encryption key without sending a pass key to the display apparatus 100 in connecting to the display apparatus 100 next time.

To send video data of a copyright-protected content to the display apparatus 100, the wireless communication control unit 302 performs authentication and key exchange that comply with a prescribed copyright protection method with the display apparatus 100 before sending the video data. Then, the wireless communication control unit 302 determines an encryption key to be used for encoding a video data stream and outputs the determined encryption key to the encryption processing unit 306.

The reading unit 303 reads video data of a content stored in, for example, a portable memory such as an optical disc. The video processing unit 304 decodes the read-out video data, converts decoded data into a video signal, and outputs the video signal to the display unit 305. The display unit 305 displays video using the received video signal.

If the manipulation receiving unit 301 receives a video transmission manipulation, the video processing unit 304 outputs the video data that has been read out by the reading unit 303 to the wireless communication unit 307. If the read-out video data is copyright-protected video data, the video processing unit 304 outputs the video data to the encryption processing unit 306.

The encryption processing unit 306 encrypts the video data received that is input from the video processing unit 304 using an encryption key that is input from the wireless communication control unit 302, and outputs encrypted data to the wireless communication unit 307. The wireless communication unit 307 performs a wireless communication with the display apparatus 100 and thereby sends, to the display apparatus 100, the video data that is input from the video processing unit 304 or the encryption processing unit 306.

Figure 3A:
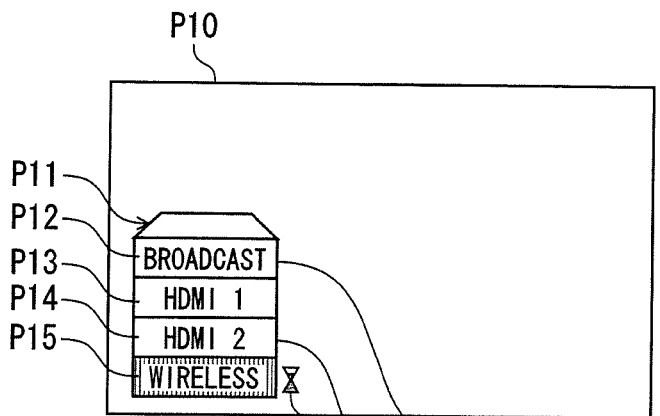
FIGS. 3A to 3E show example switching pictures which are generated by the display apparatus according to the embodiment.

FIG. 3A shows an example switching picture that is generated by the display apparatus 100. An image P11 showing a source of video being displayed on the display apparatus 100 and other selectable video sources is displayed in a picture P10. The image P11 includes an image P12 to be used for displaying video of a broadcast program received by the receiving unit 101, images P13 and P14 to be used for displaying video that is input to the HDMI input unit 102, and an image P15 to be used for displaying video received by the wireless communication unit 103. The image P11 also includes a cursor image P16 which indicates a source of video being displayed and a cursor image P17 to be used for selecting a destination of video source switching.

While the display apparatus 100 is searching for an external communication apparatus to become a communication partner of the wireless communication unit 103, an image P18 indicating that a search is underway. For example, the display apparatus 100 performs a search every prescribed time or when receiving a user manipulation that commands a search of an external communication apparatus.

Figure 3B:
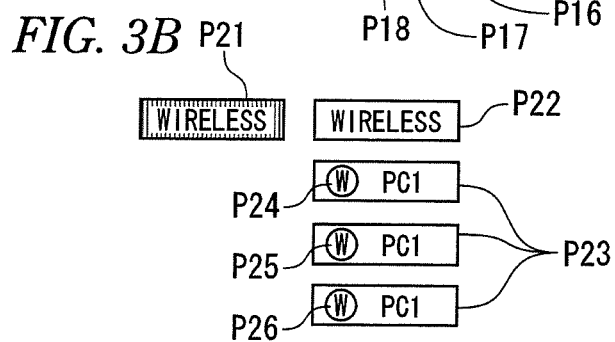

FIG. 3B shows example display forms of images to be used for displaying video received by the wireless communication unit 103. The display apparatus 100 displays an image P21 when the wireless communication unit 103 has not found (detected) a communication partner capable of sending video to the display apparatus 100, and displays an image P22 when the wireless communication unit 103 has found such a communication partner. The expression "a communication partner has been found" means a situation that the display apparatus 100 sent a search signal wirelessly to nearby apparatus and a response signal to the search signal has been received, a situation that the display apparatus 100 has received a connection request from an external apparatus, or a like situation. The display apparatus 100 judges whether or not a thus-found apparatus is a registered one by judging whether or not an apparatus identifier of the external apparatus contained in the response signal or the connection request coincides with an identifier of a registered apparatus that is stored in the storage unit 111.

When finding communication partners, the display apparatus 100 may display images P23 by acquiring apparatus names of the communication partners and indicate them in the form of images P23. The images P23 may include images P24 to P26 which show relationships between the apparatus found and the display apparatus 100. The image P24 indicates that an apparatus corresponding to the image P24 has not been connected to the display apparatus 100 yet. That is, the image P24 is displayed if the apparatus found has not sent a pass key to the display apparatus 100 and hence is not registered in the storage unit 111 as a registered apparatus. The image P25 indicates that the apparatus found was connected to the display apparatus 100 before but a wireless connection is not established with it at the present time. The image P26 indicates that the apparatus found is connected wirelessly to the display apparatus 100 at the present time.

An image indicating whether or not key exchange processing that complies with a prescribed copyright protection method has completed between an apparatus found and the display apparatus 100 or an image indicating whether or not an apparatus found is compatible with a prescribed copyright protection method may be displayed as an image P23.

Figures 3C, 3D, 3E:
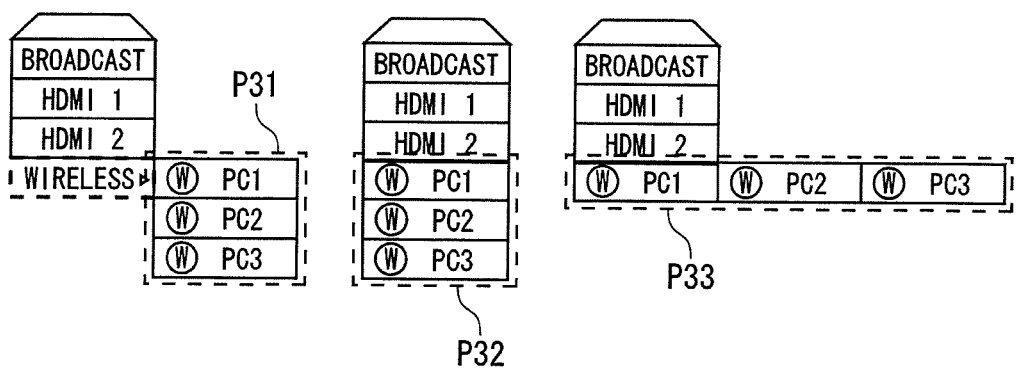

FIGS. 3C to 3E show example images that are displayed when the display apparatus 100 has found external apparatus capable of sending video. In the example of FIG. 3C, a list P31 of apparatus found is displayed beside the image P15 shown in FIG. 3A and images indicating relationships with the display apparatus 100 are displayed for the respective apparatus. In the examples of FIGS. 3D and 3E, a list P32 or P33 of apparatus found is displayed at the position of the image P15 shown in FIG. 3A in place of the image P15. The list P31, P32, or P33 may be displayed when wireless communication apparatus have been found or when the image P15 is selected by the cursor image P17 after wireless communication apparatus were found.

Figure 4A:
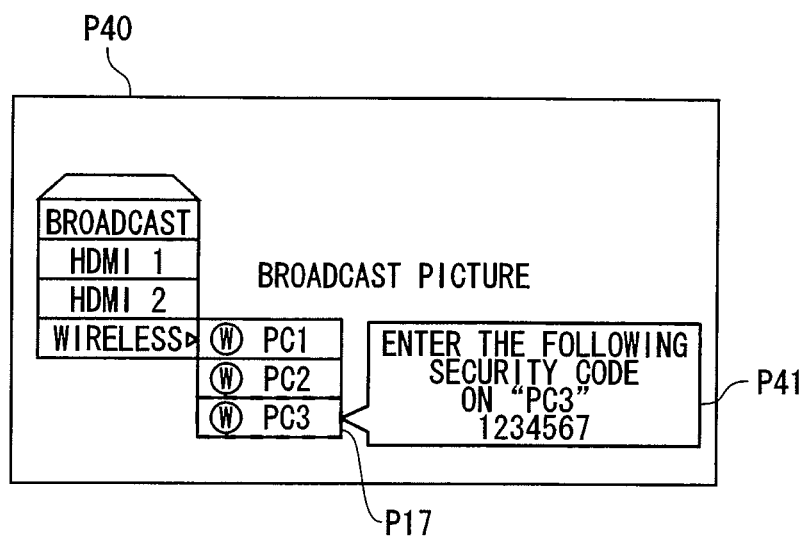
FIGS. 4A and 4B show example pass key display pictures which are generated by the display apparatus according to the embodiment.
Figure 4B:
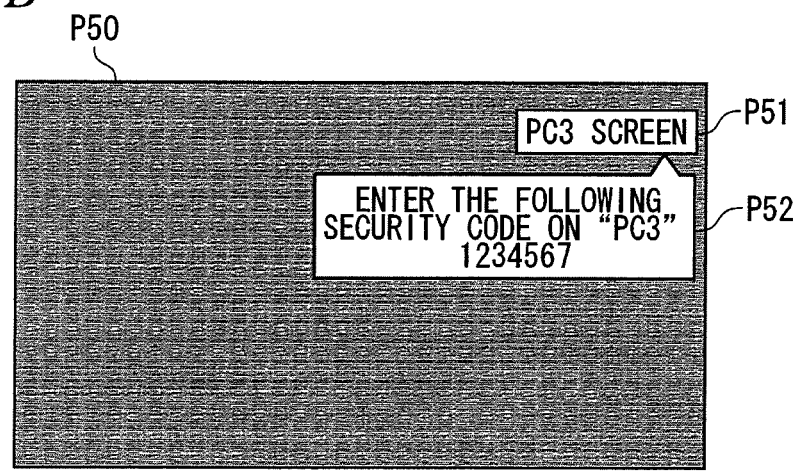

FIGS. 4A and 4B show example pass key display pictures which are generated by the display apparatus 100. FIG. 4A shows the structure of an example picture in which a pass key is displayed in the switching picture shown in FIG. 3C. The display apparatus 100 displays a picture P40 when detecting an apparatus that has not been connected to it. A pass key notification image P41 is displayed in the picture P40. The image P41 includes an image indicating a pas key and an image that urges the user to input the pass key. For example, the image P41 may be displayed when an apparatus that has not been connected to the display apparatus 100 has been found or when the cursor image P17 has been moved to the position of an image indicating an apparatus that has not been connected to the display apparatus 100.

FIG. 4B shows an example pass key display picture that is displayed when an apparatus that has not been connected to the display apparatus 100 has been selected as a video source. If an apparatus that is not registered in the storage unit 111 has been selected as a video source, since a connection between this apparatus and the display apparatus 100 is not permitted, a picture P50 is displayed without displaying video of this apparatus. An image P51 indicating the apparatus that is selected as a source apparatus and a pass key notification image P52 are displayed in the picture P50.

FIGS. 5A to 5D show an example video source switching operation which is performed by the display apparatus 100. Assume that a wireless connection is established and maintained between the display apparatus 100 and the computer 300 and the display apparatus 100 is receiving video that is being transmitted from the computer 300 (see FIG. 5A). If receiving connection requests from the computers 400 and 500 while receiving the video from the computer 300, the display apparatus 100 completes setting of connections to the computers 400 and 500 and registers the computers 400 and 500 as standby apparatus in such a manner that they are arranged in order of completion of setting (see FIG. 5B). The term "connection setting" means, for example, processing from transmission of a pass key to permission of a wireless communication, and may include key exchange processing that complies with a prescribed copyright protection method.

Where the display apparatus 100 can maintain wireless connections to plural apparatus, the display apparatus 100 may register plural apparatus as standby apparatus after completing setting of connections to the respective apparatus and establishing wireless connections to them. In other words, the display apparatus 100 may either maintain or not maintain wireless connections after completing setting of connections to respective apparatus to be registered as standby apparatus.

Figure 5A:
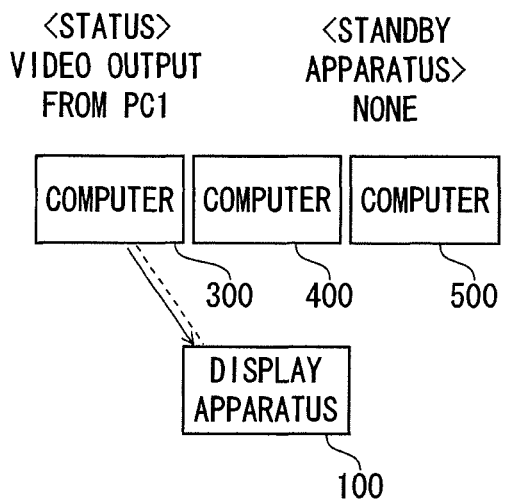
FIGS. 5A to 5D show example a video source switching operation which is performed by the display apparatus according to the embodiment.
Figure 5B:
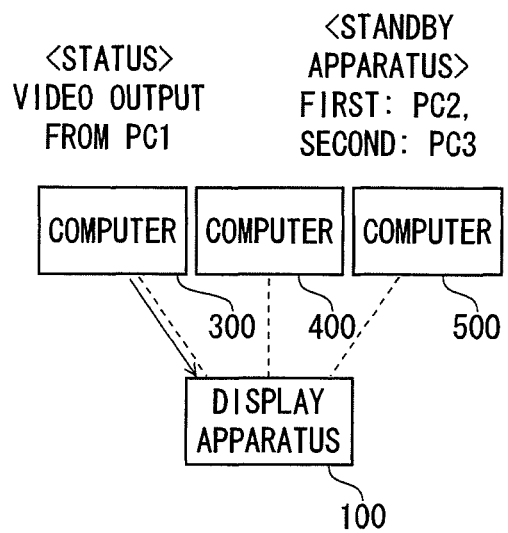
Figure 5C:
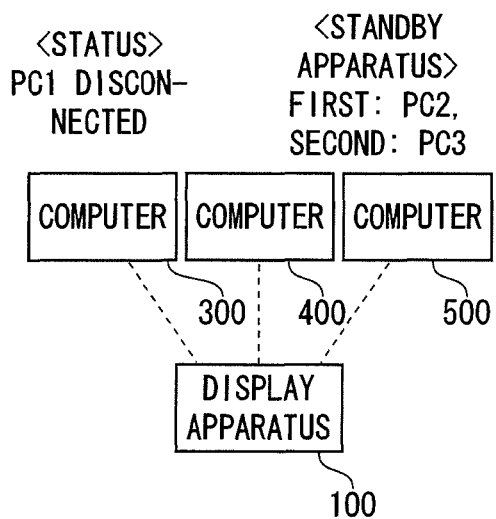
Figure 5D:
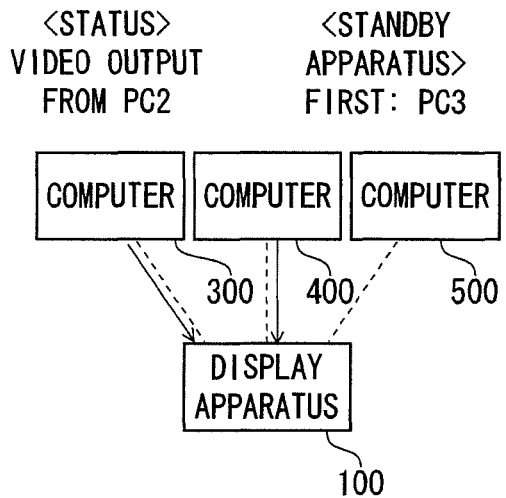

Then, if the computer 300 stops sending video to the display apparatus 100 and the wireless connection is disconnected (see FIG. 5C), the display apparatus 100 receives video from the computer 400 which is registered as the head standby apparatus and displays the video (see FIG. 5D). If no connection to the computer 400 was maintained when the display apparatus 100 was receiving the video from the computer 300, the display apparatus 100 establishes a connection to the computer 400 using the results of the connection setting that was completed when it was registered as a standby apparatus. In disconnecting the wireless connection to the computer 300, the display apparatus 100 may store the results of the setting of the connection to the computer 300 and use those results when connecting to it again.

The display apparatus 100 may set an upper limit for the number of apparatus to be registered as standby apparatus. Furthermore, the display apparatus 100 may give priority ranks to respective apparatus for the order in which to perform connection setting. Assume that apparatus A, B, C, and D were found in this order when the display apparatus 100 searched for external apparatus. If the upper limit of the number of standby apparatus is set at 3, the display apparatus 100 does not perform connection setting with the apparatus D. If the apparatus C is higher in connection setting priority rank than the apparatus A and B, the display apparatus 100 stops ongoing connection setting and perform connection setting with the apparatus C. Alternatively, the display apparatus 100 may complete ongoing connection setting and then perform connection setting with the apparatus C before the other apparatus with which connection setting has not been performed yet. Then, the display apparatus 100 registers the apparatus found as standby apparatus in order of the apparatus C, A, and B.

The display apparatus 100 may set an upper limit for the number of apparatus to be registered as standby apparatus after execution of key exchange/key generation processing that relate to copyright protection. For example, in the case of the HDCP standard, in many cases a common sink apparatus holds only one key. If it is attempted to perform key authentication with many source apparatus in the case where only one key exists, the key authentication processing may become so complex as to cause an unduly heavy processing load. In view of this, the display apparatus 100 may set an upper limit for the number of apparatus to be subjected to key authentication to thereby suppress the processing load of key authentication processing.

For example, the following restrictions may be made. The display apparatus 100 allows registration, as standby apparatus, of up to four apparatus after execution of processing that relates to permission of a wireless communication but allows execution of copyright protection processing for only a maximum of two of the four apparatus. In other words, among the four apparatus to be registered as standby apparatus, the display apparatus 100 registers two apparatus as standby apparatus after performing both of processing that relates to permission of a wireless communication and copyright protection processing and registers the other two apparatus as standby apparatus after performing processing that relates to permission of a wireless communication without performing copyright protection processing.

Furthermore, the display apparatus 100 may give priority ranks to respective apparatus for the order in which to perform copyright protection processing. For example, if the display apparatus 100 found plural apparatus that accommodate copyright protection in searching for external apparatus, the display apparatus 100 may perform copyright protection processing first with an apparatus that is given a highest priority rank. If finding a new apparatus (or receiving a connection request from a new apparatus) in a state that the number of apparatus that have been subjected to key authentication has already reached the upper limit and the new apparatus is given a highest key authentication priority rank, the display apparatus 100 cancels the current key-authentication-completed state with a certain apparatus and performs key authentication with the new apparatus.

Next, example processes relating to video reception which are executed by the display apparatus 100 will be described with reference to FIGS. 6A and 6B.

Referring to the flowchart of FIG. 6A, first, if a preset time has elapsed or a user manipulation that commands a search of external apparatus has been received (S601: yes), at step S602 the wireless communication control unit 110 searches for external apparatus by sending out a search signal. If an external apparatus is found, that is, a response signal to the search signal is received (S603: yes), the wireless communication control unit 110 judges whether or not the apparatus identifier contained in the response signal coincides with the identifier of a registered apparatus that is stored in the storage unit 111. An affirmative judgment is made at step S603 also when a connection request is received from an external apparatus. That is, if a connection request is received, the wireless communication control unit 110 judges whether or not the external apparatus is a registered one on the basis of the apparatus identifier contained in the connection request.

If the apparatus found is a registered apparatus, the wireless communication control unit 110 performs wireless communication security processing with the apparatus that sent the response signal (step S604). At this step, the wireless communication control unit 110 requests the external apparatus to send a pass key and receives a pass key that is transmitted in response. If the received pass key coincides with a pass key that is set in the display apparatus 100 itself, the wireless communication control unit 110 sends a wireless communication encryption key to the external apparatus and permits a wireless connection between the external apparatus and the display apparatus 100 itself. Alternatively, since the wireless communication encryption key has already been sent to the registered apparatus, at step S604 the wireless communication control unit 110 may permit the external apparatus a communication omitting reception of a pass key and sending of the wireless communication encryption key.

At step S605, the wireless communication control unit 110 performs key exchange with the external apparatus according to a prescribed copyright protection method and thereby generates an encryption key to be used for content protection. The wireless communication control unit 110 may execute step S605 if the external apparatus accommodates video wireless transmission according to the prescribed copyright protection method and abstain from executing step S605 if the external apparatus does not. At step S606, the wireless communication control unit 110 registers, in the storage unit 111, as a standby apparatus, the external apparatus for which the wireless communication security processing and the copyright protection processing have completed.

Then, if a manipulation that commands display of a switching picture is received (S607: yes), at step S608 the display apparatus 100 generates and displays a switching picture as shown in FIG. 3A, 3B, 3C, 3D, 3E, or 4A. If a selection manipulation for switching the video source to an external wireless communication apparatus is received (S609: yes) and the apparatus selected by this manipulation is an external apparatus (registered apparatus) that was connected to the display apparatus 100 in the past (S610: yes), at step S611 the display apparatus 100 sends a video transmission permission to the external apparatus and receives video using the settings that were made at steps S604 and S605. At step S612, the display apparatus 100 displays the received video on the display unit 106. If the video that is transmitted from the external apparatus is video of an encrypted, copyright-protected content, the display apparatus 100 decrypts the video with the encryption key that was generated at step S605.

On the other hand, if the external apparatus that was specified by the selection manipulation at step S609 is not an apparatus that was connected to the display apparatus 100 in the past (S610: no), at step S613 the display apparatus 100 displays the pass key using a picture as shown in FIG. 4A. If a pass key is received from the external apparatus (S614: yes), at step S615 the wireless communication control unit 110 performs connection setting in the same manner as in steps S604 and S605. Then, the display apparatus 100 receives video from the external apparatus at step S611.

FIG. 6B shows an example process which may be executed at step S611 shown in FIG. 6A. If the wireless connection is disconnected by a user manipulation to the external apparatus or the display apparatus 100 when the display apparatus 100 is receiving the video wirelessly from the external apparatus (S650: yes), at step S651 the display apparatus 100 sends a video transmission permission to the head one among the registered standby apparatus. At step S652, the display apparatus 100 receives video from the external apparatus that has received the permission, using the settings that were made at steps S604 and S605.

Next, example processes relating to video transmission which are executed by the computer 300 will be described with reference to FIGS. 7A and 7B. The same processes are executed by the computers 400 and 500.

Figure 7A:
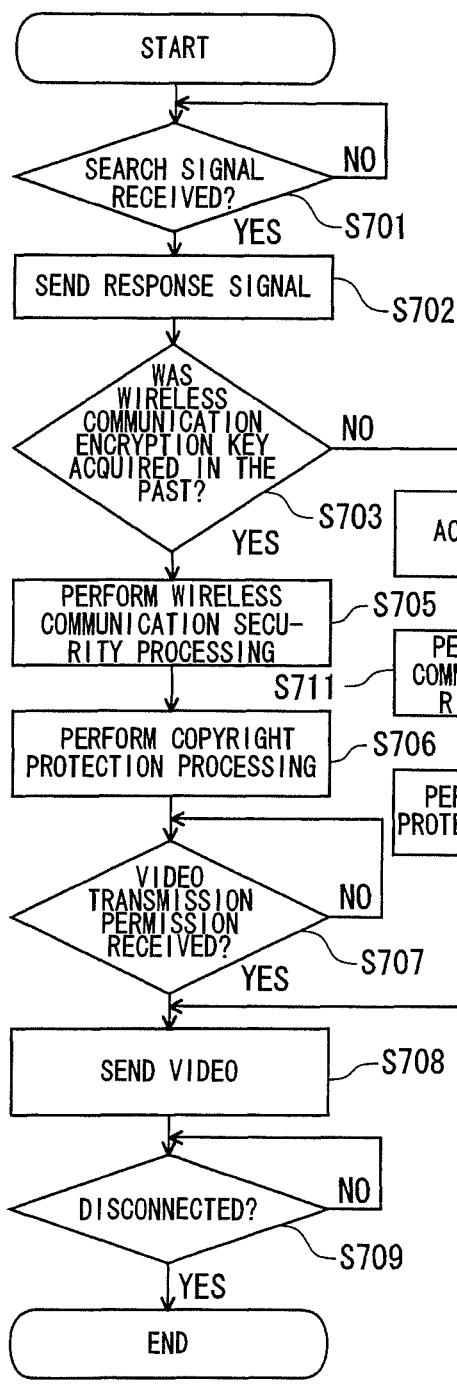
FIGS. 7A and 7B are flowcharts of example processes relating to video transmission which are executed by an external apparatus.

FIG. 7A is a flowchart of an example process relating to video transmission which is executed by the computer 300. If a search signal is received from the display apparatus 100 (S701: yes), at step S702 the wireless communication control unit 302 sends a response signal containing an apparatus identifier of the computer 300 itself to the display apparatus 100. If the wireless communication control unit 302 acquired an encryption key to be used for a wireless communication with the display apparatus 100 in the past and hence is stored with the encryption key (S703: yes), at step S705 the wireless communication control unit 302 sends the encryption key to the display apparatus 100 and performs wireless communication security processing. If a wireless communication with the display apparatus 100 is permitted in this security processing, at step S706 the wireless communication control unit 302 performs key exchange according to a prescribed copyright protection method and thereby generates an encryption key.

The computer 30 waits for transmission of a video transmission permission from the display apparatus 100. If a video transmission permission is received (S707: yes), at step S708 the computer 300 sends video to the display apparatus 100. The video that is sent at step S708 is, for example, video that is being displayed on the display screen of the computer 300 itself. To send video of a copyright-protected content, the computer 300 encrypts the content with the encryption key that was generated at step S706 and sends resulting video. If the wireless connection between the computer 300 and the display apparatus 100 is disconnected by a user manipulation performed on the display apparatus 100 or the computer 300, this process is finished.

On the other hand, if no encryption key to be used for a wireless communication with the display apparatus 100 was acquired in the past (S703: no), after the computer 300 is selected as a video source by the display apparatus 100 and a picture as shown in FIG. 4B, for example, is displayed, at step S710 the computer 300 acquires a pass key from information that is input by the user, data that is input from an imaging apparatus that has shot a pass key, or like information. At step S711, the computer 300 sends the acquired pass key to the display apparatus 100, receives (acquires) a wireless communication encryption key from the display apparatus 100, and performs, using the received wireless communication encryption key, wireless connection security processing which is the same as the security processing of step S705. At step S712, the wireless communication control unit 302 performs key exchange according to a prescribed copyright protection method and thereby generates an encryption key in the same manner as at step S706.

Figure 7B:
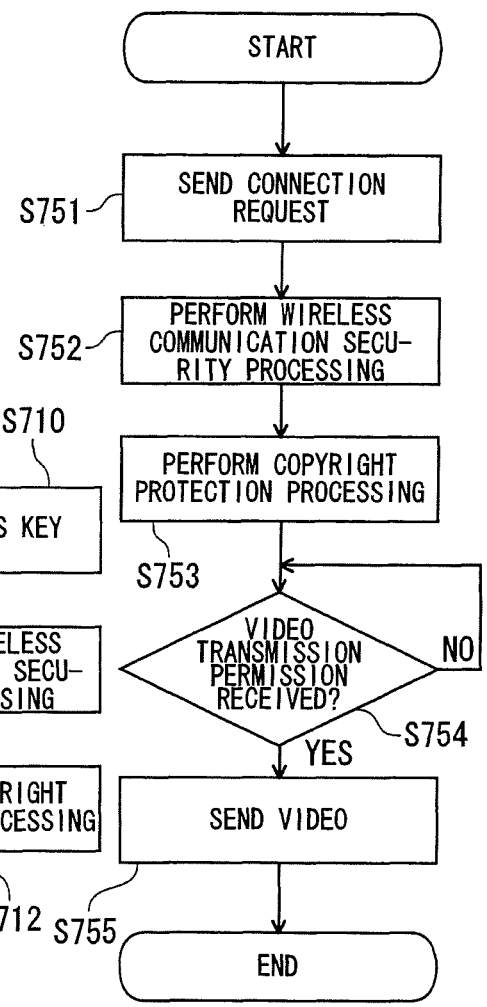

FIG. 7B shows another example process relating to video transmission which is executed by the computer 300. Whereas in the process of FIG. 7A connection setting is started in response to a search signal that is transmitted from the display apparatus 100, in the process of FIG. 7B connection setting is started as soon as the computer 300 itself sends a connection request to the display apparatus 100.

If a user manipulation that commands wireless transmission of video to the display apparatus 100 is received, at step S751 the computer 300 sends a connection request containing its own identifier to the display apparatus 100. At step S752, the computer 300 sends a pass key to the display apparatus 100 and is permitted a wireless communication. At step S753, the computer 300 performs key exchange and thereby generates an encryption key. If a video transmission permission is received from the display apparatus 100 (S754: yes), at step S755 the computer 300 sends video to the display apparatus 100.

Although the embodiment of the invention has been described above, the embodiment is just an example and should not be construed as restricting the scope of the invention. For example, the display apparatus 100 may be an apparatus which outputs video to an external display device and causes it to display the video. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video receiving apparatus to receive video from one of one or more video transmitting apparatus by a selecting manipulation, the video receiving apparatus comprising:
    a connecting module to establish a wireless connection with each video transmitting apparatus from which key information is received;
    a registering module to register all or part of the one or more video transmitting apparatus with which the video transmitting apparatus established a wireless communication in the past;
    a first display control module to display (a) identification information of the one or more video transmitting apparatus, (b) selection images that enable selection of the one or more video transmitting apparatus, (c) registration information indicating a registration status of the one or more video transmitting apparatus based at least in part of whether the one or more video transmitting apparatus has sent key information to the display apparatus, and (d) connection information indicating a wireless connection status of the one or more video transmitting apparatus;
    a video receiving module to receive video from a video transmitting apparatus using the established wireless connection when the selecting manipulation specifies the video transmitting apparatus by a selection image of the selection images;
    an encryption key processing module to generate an encryption key by performing key exchange and key authentication with two or more video transmitting apparatuses in the one or more video transmitting apparatus connected with the video receiving apparatus according to a prescribed copyright protection method before the selecting manipulation is made, wherein an upper limit of a number of the one or more video transmitting apparatus to be subjected to the key authentication is set to a prescribed number; and
    a second display control module to display the received video on the display screen.

2. The video receiving apparatus according to claim 1, further comprising
    a standby registering module to register video transmitting apparatus of the one or more video transmitting apparatus from which the respective key information is received as standby apparatus in order of reception of the key information or establishment of wireless connections, wherein
    the video receiving module starts receiving video from a head one of the standby apparatus when a wireless connection with the video transmitting apparatus from which video is being received currently is disconnected.

3. The video receiving apparatus according to claim 1, wherein
    the first display control module displays, on the display screen, a cursor image for specifying one of the selection images, and displays key information on the display screen if the cursor image is located at a position corresponding to a position of a selection image of the selection images indicating a video transmitting apparatus that is not registered in the registering module.

4. The video receiving apparatus according to claim 1, wherein
    the first display control module displays, on the display screen, encryption key information indicating whether or not the encryption key processing has been performed on the one or more video transmitting apparatus, respectively.

5. The video receiving apparatus according to claim 1, wherein
    the first display control module displays, on the display screen, compatibility information indicating whether or not the one or more video transmitting apparatus accommodate wireless transmission of video according to the prescribed copyright protection method, respectively.

6. The video receiving apparatus according to claim 1, wherein
    the encryption key processing module performs the encryption key processing with up to a prescribed number of video transmitting apparatus among plural video transmitting apparatus of the one or more video transmitting apparatus that are compatible with the prescribed copyright protection method.

7. The video receiving apparatus according to claim 6, wherein
    when a wireless connection is established with a video transmitting apparatus of the one or more video transmitting apparatus, with which the encryption key processing has not been performed in a state that the encryption key processing has been performed with up to the prescribed number of video transmitting apparatus, the encryption key processing module performs the encryption key processing with the video transmitting apparatus with which the encryption key processing has not been performed.

8. A video receiving method of a video receiving apparatus to receive video from one of one or more video transmitting apparatus by a selecting manipulation, the video receiving method comprising:
    establishing a wireless connection with each of the one or more video transmitting apparatus from which key information is received;
    registering all or part of the one or more video transmitting apparatus, with which the video receiving apparatus established a wireless communication in the past;
    displaying (a) identification information of the one or more video transmitting apparatus, (b) selection images that enable selection of the one or more video transmitting apparatus, (c) registration information indicating a registration status of the one or more video transmitting apparatus based at least in part on whether the one or more video transmitting apparatus has sent the key information to the display apparatus, and (d) connection information indicating a wireless connection of status of the one or more video transmitting apparatus;
    receiving video from a video transmitting apparatus of the one or more video transmitting apparatus using the established wireless connection when the selecting manipulation that specifies the video transmitting apparatus by a selection image of the selection images;

generating an encryption key by performing key exchange and key authentication with the one or more video transmitting apparatus connected with the video receiving apparatus according to a prescribed copyright protection method before the selecting manipulation is made, wherein an upper limit of a number of the one or more video transmitting apparatus to be subjected to the key authentication is set to a prescribed number; and displaying the received video on the display screen.

9. The video receiving apparatus according to claim 1, further comprising
a receiving module to receive identifiers of respective video transmitting apparatus of the one or more video transmitting apparatus and key information to be used for permitting a wireless communication with the video receiving apparatus from the one or more video transmitting apparatus before the selecting manipulation is made.

10. The video receiving method of claim 8, further comprising
receiving identifiers of the respective video transmitting apparatus and key information to be used for permitting a wireless communication with the video receiving apparatus from the one or more video transmitting apparatus before the selecting manipulation is made.

11. A video receiving apparatus to receive video from one of one or more video transmitting apparatus by a selecting manipulation, the video receiving apparatus comprising:
a first display control module to display (a) identification information of the one or more video transmitting apparatus, (b) selection images that enable selection of the one or more video transmitting apparatus, and (c) connection information indicating a wireless connection status of the one or more video transmitting apparatus;
an encryption key processing module to generate an encryption key by performing key exchange and key authentication with two or more video transmitting apparatuses in the one or more video transmitting apparatus connected with the video receiving apparatus according to a prescribed copyright protection method before the selecting manipulation is made, wherein an upper limit of a number of the one or more video transmitting apparatus to be subjected to the key authentication is set to a prescribed number; and
a second display control module to display the received video on the display screen.

12. The video receiving apparatus according to claim 11, further comprising
a standby registering module to register video transmitting apparatus of the one or more video transmitting apparatus from which the respective key information is received as standby apparatus in order of reception of the key information or establishment of wireless connections; and
a video receiving module to receive video from the specified video transmitting apparatus using the established wireless connection when the selecting manipulation that specifies one video transmitting apparatus by the selection image, the video receiving module starts receiving video from a head one of the standby apparatus when a wireless connection with a video transmitting apparatus from which video is being received currently is disconnected.

13. The video receiving apparatus according to claim 11, further comprising,
a receiving module to receive identifiers of respective video transmitting apparatus of the one or more video transmitting apparatus and key information to be used for permitting a wireless communication with the video receiving apparatus from the one or more video transmitting apparatus before the selecting manipulation is made.

14. The video receiving apparatus according to claim 11, further comprising,
a registering module to register all or part of one or more video transmitting apparatus with which the video transmitting apparatus established a wireless communication in the past,
wherein, the first display control module displays, on the display screen, a cursor image for specifying one of the selection images, and displays key information on the display screen if the cursor image is located at a position corresponding to a position of a selection image indicating a video transmitting apparatus of the one or more video transmitting apparatus that is not registered in the registering module.

15. The video receiving apparatus according to claim 11, wherein
the first display control module displays, on the display screen, encryption key information indicating whether or not the encryption key processing has been performed on the one or more video transmitting apparatus, respectively.

16. The video receiving apparatus according to claim 11, wherein
the first display control module displays, on the display screen, compatibility information indicating whether or not the one or more video transmitting apparatus accommodate wireless transmission of video according to the prescribed copyright protection method, respectively.

17. The video receiving apparatus according to claim 11, wherein
the encryption key processing module performs the encryption key processing with up to a prescribed number of video transmitting apparatus among plural video transmitting apparatus of the one or more video transmitting apparatus that are compatible with the prescribed copyright protection method.

18. The video receiving apparatus according to claim 17, wherein
when a wireless connection is established with a video transmitting apparatus with which the encryption key processing has not been performed in a state that the encryption key processing has been performed with up to the prescribed number of video transmitting apparatus, the encryption key processing module performs the encryption key processing with the video transmitting apparatus with which the encryption key processing has not been performed.

19. A video receiving apparatus to receive video data from one of a plurality of video transmitting apparatuses linked by wireless connection or one or more video transmitting apparatus linked by wired connection by a selecting manipulation, the video receiving apparatus comprising:
a receiver to receive video data through a wire when one of the one or more video transmitting apparatus is connected to the video receiving apparatus by wired connection;
a display controller to display selection images on a display screen, the selection images enabling selection of (i) the one of the plurality of video transmitting apparatuses linked by wireless connection or (ii) the one or more video transmitting apparatus linked by wired connection; and an encryption key processor to generate an encryption key by performing key exchange and key authentication with the plurality of video transmitting apparatuses linked by wireless connection with the video receiving apparatus according to a prescribed copyright protection method before the selecting manipulation is made, wherein an upper limit of a number of the video transmitting apparatus to be subjected to the key authentication through the wireless connection is set to a prescribed number, and wherein the display controller displays video using the received video data on the display screen.

20. The video receiving apparatus according to claim 19, wherein the display controller displays identification information of the plurality of video transmitting apparatuses linked by wireless connection.

21. The video receiving apparatus according to claim 19, wherein the display controller displays connection information indicating a wireless connection status of the plurality of video transmitting apparatuses linked by wireless connection.

22. The video receiving apparatus according to claim 19, further comprising a standby register to register the plurality of video transmitting apparatuses linked by wireless connection from which the respective key information is received as standby apparatuses in order of reception of the key information or establishment of wireless connections; and a video receiver to receive, when the selecting manipulation that specifies one of the plurality of video transmitting apparatuses by the selection image, video from a specified video transmitting apparatus using the established wireless connection, the video receiver starts receiving video from a head one of the standby apparatuses when a wireless connection with a video transmitting apparatus of the plurality of video transmitting apparatuses from which video is being received currently is disconnected.

23. The video receiving apparatus according to claim 19, further comprising, an information receiver to receive identifiers of respective video transmitting apparatus of the plurality of video transmitting apparatuses and key information to be used for permitting a wireless communication with the video receiving apparatus from one or more of the plurality of video transmitting apparatuses linked by wireless connection before the selecting manipulation is made.

24. The video receiving apparatus according to claim 19, further comprising, a register to register all or part of the plurality of video transmitting apparatuses linked by wireless connection with which a video transmitting apparatus of the plurality of video transmitting apparatuses established a wireless communication in the past, wherein, the display controller displays, on the display screen, a cursor image for specifying one of the selection images, and displays key information on the display screen if the cursor image is located at a position corresponding to a position of a selection image of the selection images indicating a video transmitting apparatus that is not registered in the register.

25. The video receiving apparatus according to claim 19, wherein the display controller displays, on the display screen, encryption key information indicating whether or not the encryption key processing has been performed on the plurality of video transmitting apparatuses linked by wireless connection, respectively.

26. The video receiving apparatus according to claim 19, wherein the display controller displays, on the display screen, compatibility information indicating whether or not the plurality of video transmitting apparatuses linked by wireless connection accommodate wireless transmission of video according to the prescribed copyright protection method, respectively.

27. The video receiving apparatus according to claim 19, wherein the encryption key processor performs the encryption key processing with up to a prescribed number of video transmitting apparatus among plural video transmitting apparatuses of the plurality of video transmitting apparatuses that are compatible with the prescribed copyright protection method.

28. The video receiving apparatus according to claim 27, wherein when a wireless connection is established with a video transmitting apparatus of the plurality of video transmitting apparatuses with which the encryption key processing has not been performed in a state that the encryption key processing has been performed with up to the prescribed number of video transmitting apparatus, the encryption key processor performs the encryption key processing with the video transmitting apparatus with which the encryption key processing has not been performed.

* * * * *